United States Patent [19]

Rogers

[11] 4,106,479
[45] Aug. 15, 1978

[54] SOLAR HEAT COLLECTOR

[76] Inventor: Ramona Rogers, 4708 Meadow La., Sioux City, Iowa 51104

[21] Appl. No.: 712,224

[22] Filed: Aug. 6, 1976

[51] Int. Cl.² .................................................. F24J 3/02
[52] U.S. Cl. ..................................... 126/270; 126/271
[58] Field of Search ............... 126/270, 271; 237/1 A; 350/106, 109, 286, 167

[56] References Cited

U.S. PATENT DOCUMENTS

| 1,264,374 | 4/1918 | DeFlorez | 350/286 X |
| 3,985,116 | 10/1976 | Kapany | 126/271 |

FOREIGN PATENT DOCUMENTS

| 1,012,283 | 7/1952 | France | 350/109 |
| 60,143 | 12/1933 | Netherlands | 350/109 |

Primary Examiner—William F. O'Dea
Assistant Examiner—Larry Jones
Attorney, Agent, or Firm—Roylance, Abrams, Berdo & Farley

[57] ABSTRACT

A solar energy collector including a bank of pyramidal or conical units having a relatively small tip angle. Translucent cover means having pyramidal shaped bosses of large tip angles serve to concentrate and preserve the heat. The units may be assembled so as to be properly oriented to the sun, or the pyramid may be constructed in a form other than a regular pyramid with its base at a right angle to its median line for the same purpose.

9 Claims, 12 Drawing Figures

SOLAR HEAT COLLECTOR

BACKGROUND AND SUMMARY OF THE INVENTION

This invention relates to solar heating and more particularly to a device for collecting solar energy and transferring that energy to a heating fluid.

The recent realization that sources of fossil fuels and particularly of petroleum fuels are sharply limited has brought a search for alternate energy sources. Wind and wave action have been considered, but the most available source would seem to be solar energy.

My invention is directed toward the concentration and collection of solar energy. Generally, collectors of solar energy include a flat plate with dark surfaced tubes or the like on which the sun's rays are focused. Such collectors require careful alignment with the position of the sun, especially when concentration of sun's rays such as lenses or reflectors are used.. My device eliminates or at least considerably modifies that requirement.

My invention does that by using pyramid-shaped cups having dark inner surfaces on which the sun's rays will impinge directly, almost regardless of the direction in which the main collector surface is oriented. Also, energy will be reflected within the cup so that there is nearly always a surface of the collector on which the heat ray will be collected. The collector may be enhanced by use of a cover also using pyramidal forms on its surface. I also prefer that the outer surfaces of the cups be a reflective surface.

FIGURES

FIG. 1 is a front elevational view of a bank of collectors formed of rectangular based pyramids, FIG. 2 is a side elevational view of the device of FIG. 1, FIG. 3 is a view similar to FIG. 1 of a bank of pyramids with triangular bases, FIG. 4 is a side elevational view of the bank of FIG. 3, FIG. 5 is a view similar to FIG. 1 of a bank of pyramids with hexagonal bases, FIG. 6 is a side elevational view of the bank of FIG. 5, FIG. 7 is a pictorial view of a single collector such as may be used in the bank of FIG. 1, FIG. 8 is a view similar to FIG. 7 of a collector having a triangular base.

DESCRIPTION

Briefly my invention comprises a bank of pyramid-shaped collectors having dark inner surfaces opened to the sun. A cover of translucent material — preferably readily penetrated by heat rays — having a surface embossed with pyramidal shapes may be used.

More specifically and with reference to the drawings, I propose to use a plurality of cupped collectors 10 each having a base of any of various shapes as shown in the other figures. The open end 11 of each pyramid of the collector is directed generally toward the sun so that the sun's rays will impinge on the inner surface. That surface, in order to absorb the heat to the greatest degree possible, is colored a flat black color. I also prefer to use a deep pyramid having an angle at the apex 12 which is as small as conveniently possible. In order that the full assembly may be used in various positions, I suggest that the pyramid need not be a vertical pyramid, but that the axis may be slanted at other than perpendicular to the base. It is desirable to have the axis oriented so that the tip is pointed away from the sun.

Figure 1:
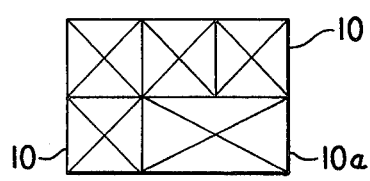
Figure 2:
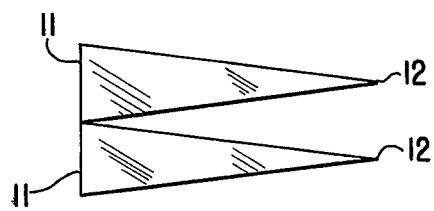
Figure 3:
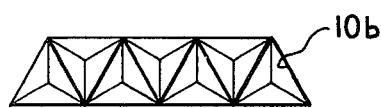
Figure 4:
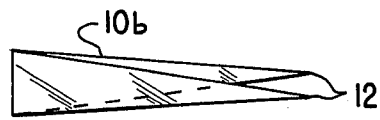
Figure 5:
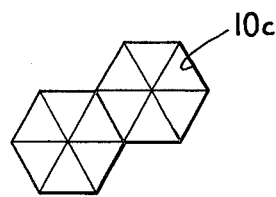
Figure 6:
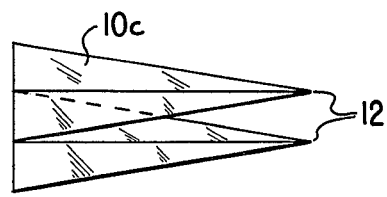
Figure 7:
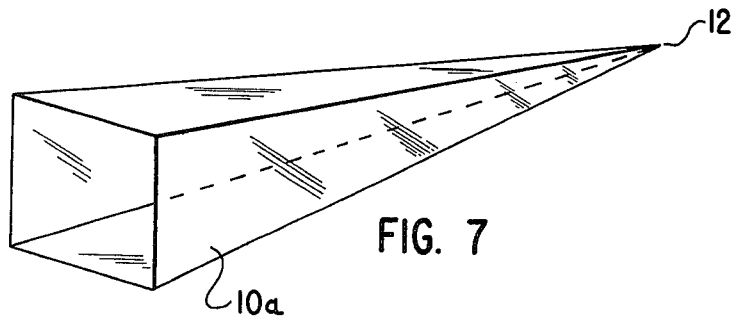
Figure 8:
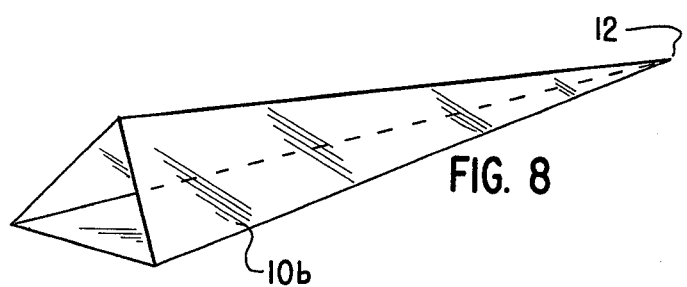
Figure 9:
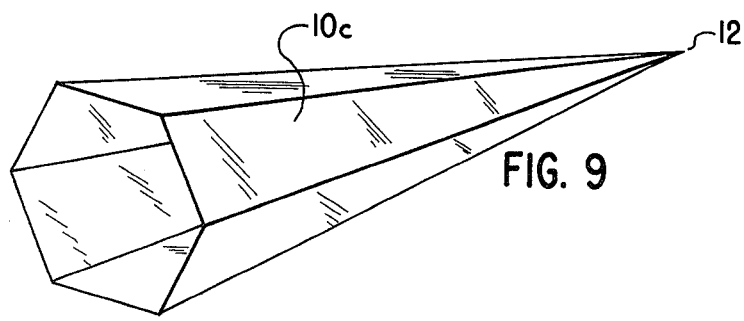
FIG. 9 is a view similar to FIGS. 7 and 8 of a hexagonal based collector.
Figure 10:
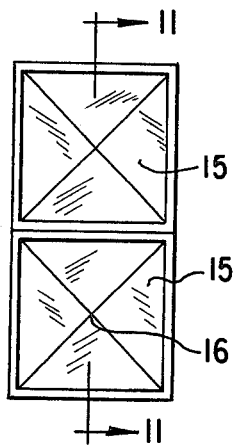
FIG. 10 is a plan view of a pair of bosses of the type used on a cover of a collector.
Figure 11:
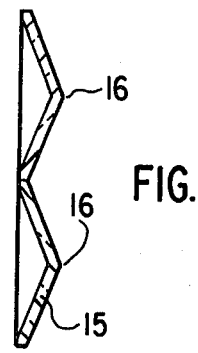
FIG. 11 is a sectional view from line 11—11 of FIG. 10.

As shown in the various figures, the pyramidal collector may have any of various shapes of the base. In FIG. 1, for instance, the basic shape is a square base as illustrated by the collector 10. However, a rectangular shape is illustrated at 10a in the same figure. Also, FIGS. 3 and 4 illustrate triangular bases on the collectors 10b, and FIGS. 5 and 6 show collectors 10c with hexagonal bases. These cups are illustrated pictorially in FIGS. 7, 8 and 9 respectively.

In every case, the angle at the apex 12 is preferably kept small with a resultant deep cup so that the sun≠s rays do not strike any interior surface at a 90° angle or greater. In an assembled collector, the open ends of the cups would be assembled in a single plane which might be considered the front, so that the apexes will be spaced from each other. By properly enclosing the assembly in a container, not shown, to enclose the sides and the back, a fluid can be circulated around the cups. That fluid, whether air or other gas or a liquid, as it circulates, will pick up the heat from the walls of the cups which can then be transmitted to the place to be heated, or to a storage unit adapted to store the heat for future use.

Figure 12:
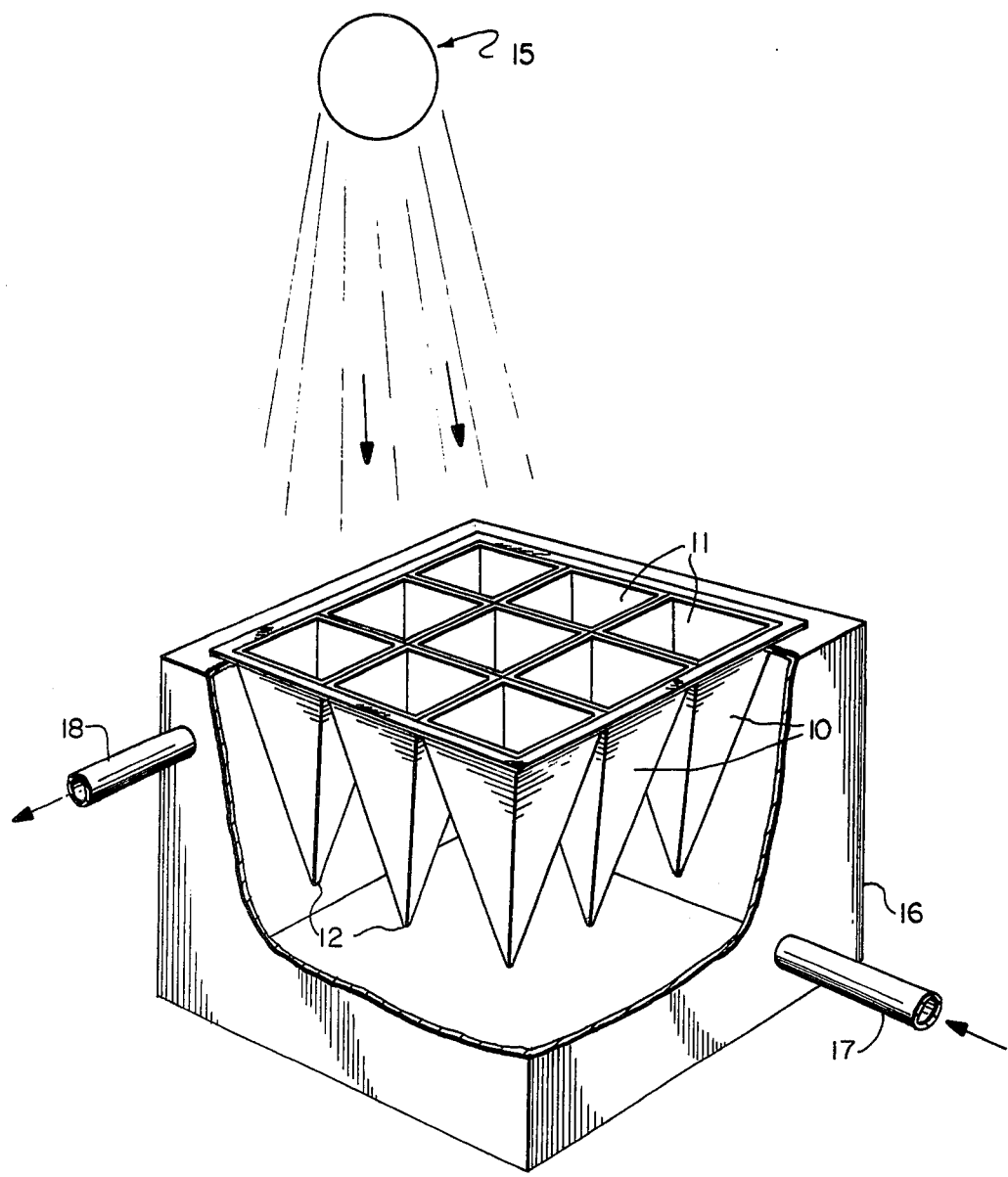
FIG. 12 is a perspective view of a bank of collectors showing the orientation of the open bases thereof generally toward the sun.

As shown in FIG. 12, the collectors are attached edge-to-edge at the margins of their open bases 11 so that the bases are exposed to the sun 15 to permit the interior surfaces to receive and absorb the solar energy therefrom. The collector assembly can be mounted in a chamber 16 so that the fluid (air or water, for example) can circulate around the external pyramidal surfaces thereof and absorb heat therefrom. Chamber 16 can be a space such as a room which is to be heated, or it can be coupled, such as by conduits 17 and 18, along with pumps or fans, as appropriate, to another space to be heated or to storage or other apparatus.

The front face or open face of the collectors may be covered by a sheet of material which will allow as much transmission of heat rays as possible. I have found that such a cover is more effective if the surface is embossed with pyramidal-shaped bosses 15. In contrast to the deep cups of the collectors 10, I have found that an angle of approximately 135° at the apex 16 of the embossed pyramids works best. However, neither the shape nor the size of the base appears to be critical, and therefore, it is feasible to use a cover having square-based pyramids over a bank of hexagonal-based pyramids of different dimensions or any other mixed arrangement.

I claim:

1. A solar energy collector comprising a plurality of solar radiation absorbing receivers, each of said receivers being in the shape of a hollow pyramid having an open base and extending to a point at the interior of the apex, means for joining said pyramids together at their bases, and means including the inner walls of the pyramids are operative to absorb solar radiation when said bases are oriented generally toward the sun, whereby the energy absorbed by the receivers is available for transfer to a working fluid.

2. The device of claim 1 in which said pyramids have a small apex angle, thus forming a deep pyramid.

3. The device of claim 2 in which the base of each of said pyramids is rectangular.

4. The device of claim 2 in which the base of each of said pyramids is triangular.

5. The device of claim 2 in which the base of each of said pyramids is hexagonal.

6. The device of claim 2 in which said plurality of pyramids is enclosed by a cover of heat ray transmissable material disposed across the open base ends of said pyramids.

7. The device of claim 6 in which said cover is formed with a series of pyramidal-shaped bosses thereon.

8. The device of claim 7 in which said bosses have an angle at the apex of said pyramidal shape of 135°.

9. A solar energy collector according to claim 1 wherein the interior surfaces of said pyramids are coated with a low reflectance black coating and the exterior surfaces thereof are reflective.

* * * * *